United States Patent [19]

Martin et al.

[11] 4,126,762

[45] Nov. 21, 1978

[54] METHOD AND SYSTEM FOR ACCUMULATING DATA OVER NONDEDICATED TELEPHONE LINES

[76] Inventors: John R. Martin, 3129 W. Mill Rd., Milwaukee, Wis. 53209; Robert S. Block, 777 W. Glencoe Pl., Milwaukee, Wis. 53217

[21] Appl. No.: 683,161

[22] Filed: May 4, 1976

[51] Int. Cl.$^2$ .......................................... H04M 11/08
[52] U.S. Cl. ...................................... 179/2 A
[58] Field of Search .................. 179/2 A, 2 AM, 84 R

[56] References Cited

U.S. PATENT DOCUMENTS

| | | | |
|---|---|---|---|
| 3,360,777 | 12/1967 | Kolm | 179/2 A |
| 3,532,822 | 10/1970 | O'Hanlon | 179/2 A |
| 3,551,597 | 12/1970 | Russell | 179/2 AM |
| 3,702,904 | 11/1972 | Bard | 179/2 A |
| 3,783,193 | 1/1974 | Lee | 179/2 A |
| 3,876,836 | 4/1975 | Langan | 179/2 A |
| 3,902,016 | 8/1975 | Blouch | 179/2 A |

*Primary Examiner*—Kathleen H. Claffy
*Assistant Examiner*—Gerald L. Brigance

*Attorney, Agent, or Firm*—Burns, Doane, Swecker & Mathis

[57] ABSTRACT

A system wherein a telephone calling signal from a central station initiates the connection of a remote terminal, including a data accumulator, at a subscriber's station to a nondedicated telephone line for reading by a billing processor computer at the central station. In one embodiment, sequential ringing signals having a different time spacing than the signals from a normal telephone call may, through operation of a ring muting circuit at the subscriber's station, condition the remote terminal to intercept the ringing signals and to provide selective connection of the accumulator to the line without disturbing the subscriber or disrupting normal telephone operation. Alternatively, timing means may be operated at the subscriber's station to condition the remote terminal and provide a short time window during a time of the day when the telephone there is not likely to be used for normal telephone calls so that a call made from the central station during the time window will cause connection of the data accumulator. In both embodiments conditioning and connection of the subscriber terminal are accomplished without actuating the subscriber ringer.

11 Claims, 6 Drawing Figures

METHOD AND SYSTEM FOR ACCUMULATING DATA OVER NONDEDICATED TELEPHONE LINES

BACKGROUND OF THE INVENTION

The present invention relates to a system for connecting a central station through a telephone switching system to a remote terminal that is associated with a particular nondedicated subscriber telephone line. The remote terminal, as discussed hereinafter, may be considered as a data accumulator. However, it will be recognized that certain aspects of the present invention have application for other uses such as, for example, surveillance of the premises.

A number of services provided in homes or other diverse locations require the reading of a meter or other data accumulator on a periodic basis in order to bill the customer for the services. Similarly, data relating to a condition such as that of an alarm on the premises may require periodic monitoring.

The accumulation of data or the periodic monitoring of conditions at a large number of diversely spaced locations may be a time consuming and expensive job if accomplished by traveling to each location. It is thus desirable to accumulate such data at a central location without the necessity of traveling to each location and with a minimum of human intervention.

One of the more desirable ways of providing communication between a central station and a remote station is via nondedicated telephone lines that provide normal telephone service to the remote station. Nondedicated lines are available at most locations but for successful use of such lines the access system should be capable of connecting the central and remote stations without disturbing the customer at the remote location or disrupting normal telephone service.

In one form of the invention, a data accumulator is provided at the subscriber's station for registering the sum of services used as for detecting a condition at the subscriber's station. These services may constitute viewing of pay television programs or of programs from cable television. Also, the system might be used for reading water, gas or electric meters, etc., or for noting security conditions on the premises.

A central computer or billing processor may be provided at the central or control station for periodically, as once per month, reading the information in the accumulator. The periodic reading may be accomplished by the central computer placing a call through the telephone line to the subscribers' stations with means at the latter stations to intercept the call and place the data accumulator in connection with the billing processor. As will be seen hereinafter, the connection is effected without disturbing the customer or otherwise disrupting normal telephone service. For example, the subscriber's station may be conditioned to receive the call from the central station in a manner distinguishing the preconditioning from an ordinary telephone call, e.g., automatically as a result of a signal sent to the station, as through a signal imposed on a television program or a multiple telephone calling and muting technique.

The principles embodied in the system may also be used to monitor a subscriber's home or place of business for noises indicative of the presence of intruders when the premises are otherwise unoccupied. In that case, a microphone arrangement would be used instead of a data accumulator. Also, the telephone calls would preferably be initiated from the cental station and the period between them would be short, as for example, fifteen minutes.

It is accordingly an object of the invention to provide an improved novel method and apparatus for remote reading of information over nondedicated telephone lines.

Another object is to provide a novel and improved method and apparatus for remote reading of a data accumulator over nondedicated telephone lines wherein the accumulator provides information as to the amount of service used by a subscriber to the service.

A further object of the invention is to provide a novel method and apparatus whereby a central station under the control of a provider of services, such as a pay or cable television system operator, can periodically read a data accumulator device located at the subscriber's station over commercially installed, nondedicated telephone lines connecting the stations to telephone switching equipment so as to facilitate the determination of the amount the services used by the subscriber.

Yet another object of the invention is to provide a novel method and apparatus as referred to in the object immediately preceding in which the interchange of information between the data accumulator and the central station is made through the use of commercially installed, nondedicated telephone lines without disturbing the subscriber or disrupting normal telephone service.

These and other objects of the invention will become more fully apparent from the claims, and from the description as it proceeds in conjunction with the appended drawings.

DESCRIPTION OF THE PREFERRED EMBODIMENT

Figure 1:
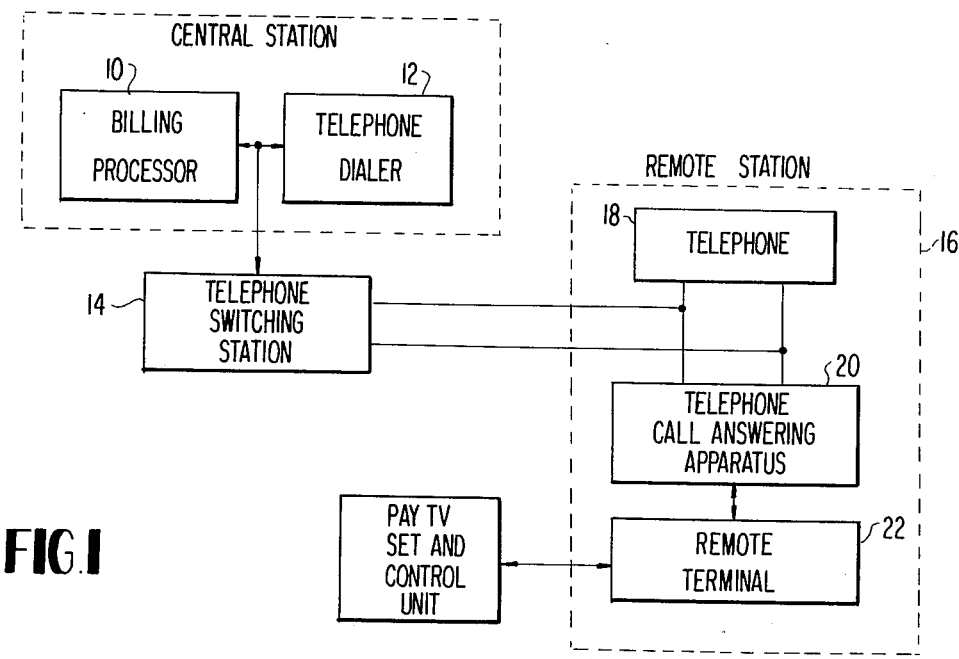
FIG. 1 is a block diagram of a system embodying the present invention.

In the system illustrated in FIG. 1, a central station includes a billing processor 10 which may be composed of data processing equipment sufficient to identify each customer and a particular commodity being metered. It is contemplated that, on a periodic basis such as monthly, a telephone dialer 12 will be used in conjunction with the billing processor 10 to place the data processing equipment at the central station in communication with the remote terminal at the subscriber station through a telephone switching station 14. The conventional telephone switching station 14 is connected through a pair of nondedicated telephone lines to the subscriber station 16, which normally includes a telephone 18. Nondedicated lines as discussed herein are lines which are commercially installed for normal telephone service as in a home and are thus connected to the telephone 18. In parallel with the telephone 18, the present invention contemplates the use of a selective telephone call answering apparatus 20 which is preconditioned, as will hereinafter be described, and will respond only to calls originating from the telephone dialer 12 for connecting the remote terminal 22 to the billing processor 10.

Operation of the telephone call answering apparatus 20 will not interfere with the normal use of the telephone 18. Outgoing calls may be made with no change in the operation of the telephone 18. Incoming calls will be received with no change excepting that, in the preferred embodiment of the invention, at least a part of the first ringing signal on each incoming call will be muted. If the second and subsequent ringing signals are received within the normal time period, typically 5 or 6 seconds from the beginning of the preceding ringing signal, the telephone call answering apparatus 20 in no way interferes with the bell or other audible signal produced by the telephone in response to the alternating voltage calling or ringing signal.

On the other hand, if after the first ringing signal is received, the second ringing signal is received within a time window, either before the normal five second delay between ordinary successive ringing signals or subsequent to this normal delay, e.g., between about 8 and 16 seconds, then the telephone call answering apparatus 20 will immediately seize the line and prevent telephone 18 from responding with an audible call signal.

Accordingly, a call is conventionally placed to the subscriber station by the billing processor 10 in conjunction with the telephone dialer 12. The call is disconnected by the processor before the end of the muting period of the first ringing signal. The processor then immediately places another call to the subscriber station, timed so that the first ringing signal of the subsequent call is received at the subscriber station during the time window established by the first call. In this manner, the second call is seized, connecting the central and remote stations without disturbing the subscriber or otherwise disrupting normal telephone service.

Each subscriber station may be accessed in this manner and data may be transferred as part of the routine carried out by the billing processor 10. A routine for performing the calling and transferring functions may utilize conventional automatic dialing and interrogating techniques timed as previously described and as further described in connection with the discussion hereinafter of the equipment at the remote station.

Figure 2:
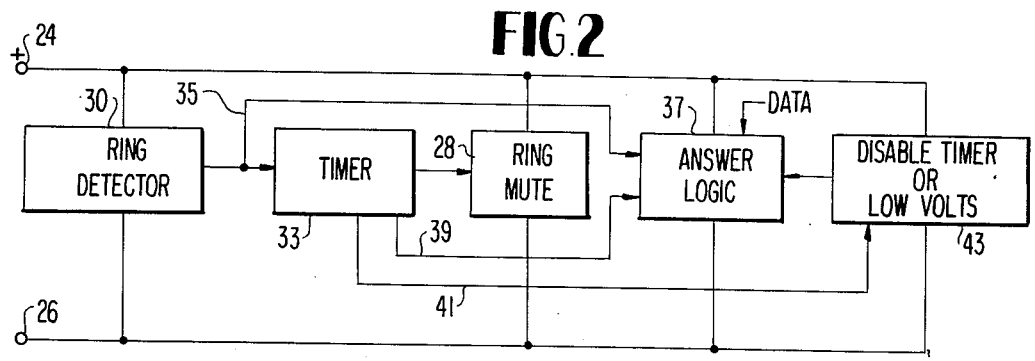
FIG. 2 is a block diagram of the telephone call answering apparatus of FIG. 1.

One embodiment of the equipment at the remote stations is illustrated and described in greater detail in connection with FIGS. 2-4 to facilitate an understanding of the invention. Referring now to FIG. 2, terminals 24 and 26 are connected to the telephone lines with terminal 24 connected to the positive line. The logic of the system requires that at least a part of the first ring be muted by ring mute state 28. At the same time, the alternating voltage of the normal calling signal will be detected by ring detector 30 which produces an output signal to start the timer 33. Each time a new ringing signal is detected by the ring detector 30, the signal on lead 35 is provided to answer logic 37.

A first output signal from timer 33 is applied on lead 39 as another input to answer logic 37. The timing signal on lead 39 thus serves as one enabling input to answer logic 37, and the timing of the second signal on lead 35 recieved by answer logic 37 will determine whether the telephone call is a normal call or whether it is a call initiated by the telephone dialer 12 in the system of FIG. 1. If the latter, the answer logic makes available access to the remote terminal. Data stored in the remote terminal is thus available to the billing processor 10, and new signals from billing processor 10 can be sent to the remote terminal.

A second output signal from timer 33 is provided on lead 41 which is connected to a disable timer circuit 43, which also controls answer logic 37. If the second calling signal occurs at the time of the normal second ring on the telephone 18, circuit 43 prevents the answer logic circuit 37 from making a connection to the remote terminal 22.

Figure 3:
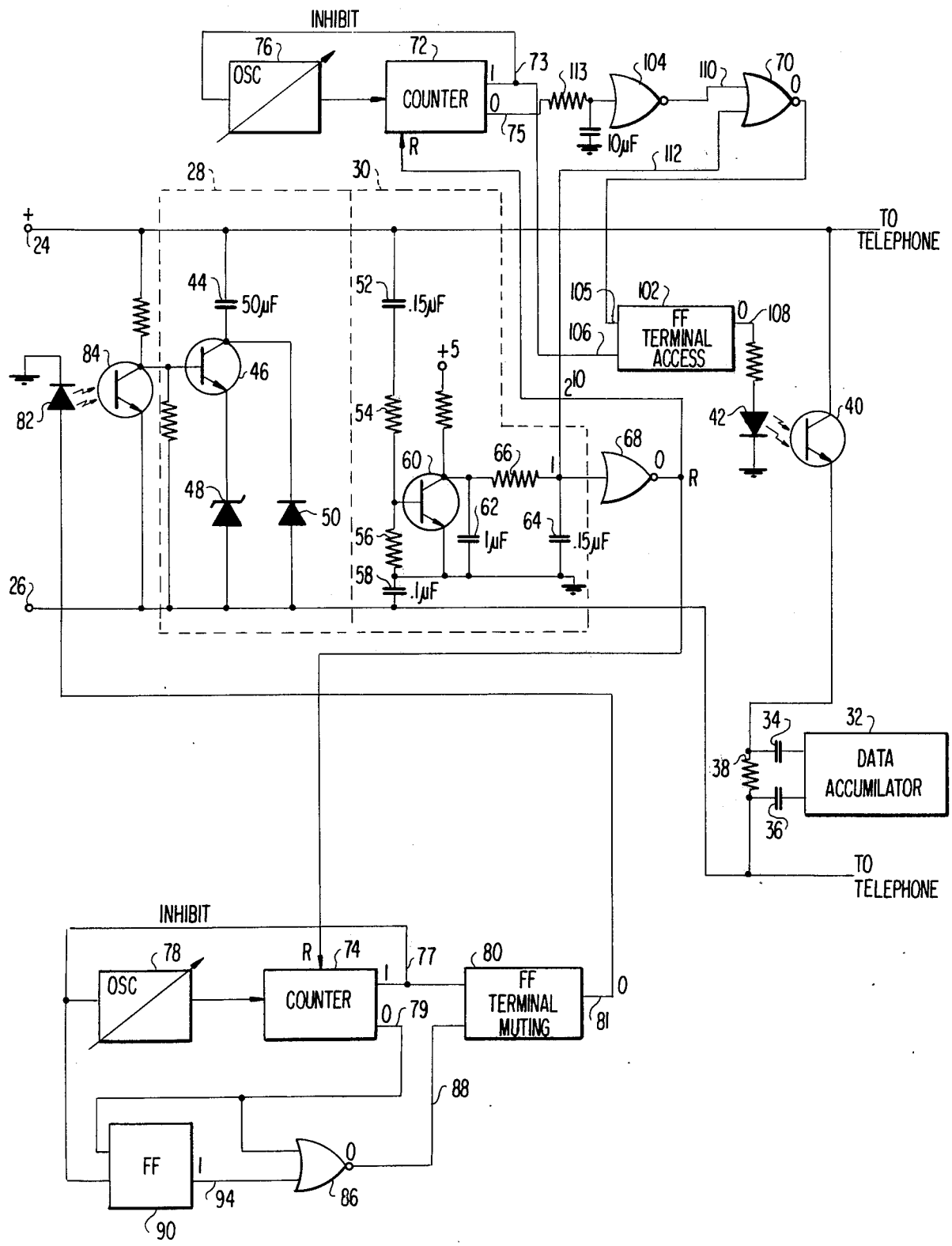
FIG. 3 is a logic diagram of the telephone call answering apparatus shown in FIG. 2.

In FIG. 3, similar reference numerals have been used for corresponding circuits that have been described in connection with FIGS. 1 and 2. The telephone lines are connected to terminals 24 and 26 as illustrated, and also to the telephone instrument. The ring mute circuit is shown inside dotted lines 28. The ring detector circuit is shown inside dotted lines 30.

The logic of the system requires that at least part of the first ringing signal be muted. If the second ring occurs, according to the illustrated embodiment within 8 seconds after the first ringing circuit, the muting circuit is disabled and each additional ringing signal which occurs within the normal ringing interval of around 5 to 6 seconds, will cause continued ringing until the telephone is answered or the ringing signals are otherwise stopped.

On the other hand, if a second ringing signal occurs in the time interval of between 8 and 16 seconds after the first ringing signal starts, then the line is answered immediately by the telephone call answering apparatus of FIG. 3 before the telephone can ring. When answered, the remote terminal is immediately coupled to the telephone line to provide communication with any suitable input-output device.

With reference to FIG. 3, a data accumulator 32 is shown coupled to the telephone lines 24 and 26 through capacitors 34 and 36, which are connected across a resistor 38. Transistor 40 may be an MCT 26 which is switched on and off by radiation emitted from diode 42 so that when diode 42 is conducting, transistor 40 can be considered essentially as a short circuit.

The data accumulator may be of any suitable type for registering usage of metered quantities of commodities such as water, electricity, gas or subscription television. It is contemplated that access to the data accumulator 32 will be gained on a periodic basis for updating the information in the billing processor 10 of FIG. 1. With the data accumulator connected across the nondedicated telephone lines by the transistor 40 in its conductive state, the accumulator 32 may be interrogated or read from the central station in any convenient manner, e.g., by a shift clock signal. If bills are sent on a monthly basis, access once a month would be sufficient. Alternatively, the data accumulator may comprise an amplifier connected to a microphone or other device for detecting unauthorized entry or intrusion into secure areas such as warehouses, stores, or home residences. In such a case, calls would be much more frequent, and possibly as many as four or more an hour in periods when surveillance is desired.

The ring mute circuit 28 may include a large capacitor 44 which is connected in series with a transistor 46 and Zener diode 48. A second diode 50 is connected in parallel with the transistor 46 and Zener diode 48. It has been found that a 50 microfarad capacitor 44 connected in this circuit arrangement is sufficiently large to swamp the ringing signal by preventing sufficient voltage to be developed across the telephone line to cause the telephone instrument to ring or produce its normal audible signal. Diode 50 provides a d.c. charging path for capacitor 44 during the ringing signal that is to be muted.

The ring detector 30 may include a capacitor 52, two resistors 54 and 56, capacitor 58, transistor 60 and a muting filter including capacitors 62 and 64 and resistor 66. When the first ringing signal occurs, an alternating voltage of between about 3 and 5 volts is present across the network including capacitor 52, resistors 54 and 56, and capacitor 58. The logic system may operate from a 5 volt power supply, one terminal of which is shown in FIG. 3 as being grounded for purposes of simplifying the circuit diagram, and the other terminal connected to the collector resistor of transistor 60.

A logical NOR gate 68 is connected to the output of the filter. When the telephone line is not answered and no ringing signal is present, the input terminal to NOR circuit 68 is a logical 1 and the output is a logical 0. When a ringing signal is present, transistor 60 becomes effectively a short circuit and the voltage drops sufficiently to place a logical 0 at the input of the NOR circuit 68 and also to the input of NOR circuit 70. The duration of this change in logical levels corresponds approximately to the duration of the ringing signal.

The output terminal of NOR gate 68 is identified with the letter R. This terminal is connected so that its level is applied at terminal R as the reset signal to each of two counters 72 and 74. Counters 72 and 74 are binary counters and, in the illustrated embodiment, are wired to stop at the count of $2^{10}$ and $2^7$, respectively. Each counter is supplied with pulses from a respective oscillator 76 and 78 which may be of any suitable conventional type and may be adjustable in frequency to vary the muting time interval and the time window discussed previously.

In the normal operation with no ringing signal present and the telephone not in use, the output terminal 73 carries a logical 1 signal corresponding to a count of $2^{10}$, and the output terminal 75 corresponding to a count of $2^9$ carries a logical 0 signal in the case of counter 72. In the case of counter 74, the output terminal 77 corresponding to a count of $2^7$ has a logical 1 signal, whereas the output terminal 79 corresponding to a count of $2^6$ has a logical 0 signal. Both counters remain dormant at their full count condition until a ringing signal is received.

The disable muting flip-flop circuit 80 is connected to the output of counter 74 and normally has a logical 0 output signal at terminal 81 which is applied to a light emitting diode 82 which has its other terminal connected to ground. Transistor 84 is controlled by the light from diode 82. No light is present when the telephone is not in use and no ringing signal occurs on the telephone line. When activated, diode 82 causes transistor 84 to become effectively a short circuit, thereby causing transistor 46 to turn off. This action effectively removes the large capacitor 44 from across the telephone line, allowing the ring signal to build to a sufficient level to cause ringing of the telephone. The circuit voltage is about 3 to 5 volts when the telephone is answered. Zener diode 48 is set to 4.7 volts, which does not permit current to flow through transistor 46 when the telephone instrument is in normal use, and thus keeps the large capacitor 44 from swamping signals present on the phone lines 24 and 26.

The disable muting flip-flop 80 is held in its illustrated condition with no signal applied to the diode 82 by reason of counter 74 returning to its maximum count $2^7$ and remains at this condition until the output signal from NOR gate 86 on lead 88 changes from a logical 0 to a logical 1. This happens when counter 74, after having been reset by a signal on terminal R, reaches the count of $2^6$, which changes the level at terminal 79 to a logical 1. This signal is applied to NOR circuit 86 and to flip-flop 90. The logical 1 applied to flip-flop 90 causes the signal on lead 94 to change from a logical 1 to a logical 0. This alone does not change the logical signal on lead 88. However, if a reset signal is received at terminal R at this time, then the logical signal at terminal 79 reverts to a 0 while the condition of flip-flop 90 does not change. Because both inputs to NOR circuit 86 are now zero, the output signal on lead 88 becomes a logical 1 thereby causing disable muting flip-flop 80 to trigger and produce at its output terminal a logical 1 which in turn causes light emitting diode 82 to become conductive, and thereby disable the ring mute circuit 28. The time at which the ring mute circuit 28 is disabled can be varied by varying the frequency of the oscillator 78 and/or by varying the count at which the counter 74 clocks the flip-flop 90. It can thus be seen that the muting circuit can be disabled after only a portion of the first ringing signal is received or after the entire first ringing signal has been received.

Counter 72 operates in a manner similar to counter 74. When a reset signal is received on terminal R, the logical 1 signal at terminal 73, which serves as an inhibit signal for oscillator 76, changes to a 0 and oscillator 76 produces pulses which cause the counter to advance in a conventional manner. Counter 72 controls the terminal access flip-flop 102 through a first circuit including NOR gates 104 and 70, and through a second circuit by a connection from terminal 73 to terminal 106 on terminal access flip-flop 102. In the quiescent state, the terminal access flip-flop 102 has an output signal of logical 0 on lead 108 which keeps light emitting diode 42 in a nonconducting state. Upon receipt of a logical 1 from NOR gate 70, terminal access flip-flop 102 changes state and produces a logical 1 output on lead 108.

When the count in counter 72 reaches $2^9$, or some other desirable count, the output signal on terminal 75 of counter 72 that is connected to NOR gate 104 becomes a logical 1 and its output signal on lead 110 becomes a logical 0. If this occurs at the same time that an incoming ringing signal to be detected by ring detector 30, the logical 1 signal normally on lead 112 reduces to a logical 0, thereby producing a logical 1 output signal from NOR gate 70 which causes terminal output flip-flop 102 to trigger. This effectively places resistor 38 across the telephone line. The resistance is sufficiently small to cause a latch-up at the telephone exchange. Capacitors 34 and 36 provide the d.c. isolation for the control function in communicating with the data accumulator 32. Resistor 38 could also control one winding of a transformer and a second winding on the transformer would be used for connection to the data accumulator 32. Capacitors 34 and 36 would not be required then.

The frequency of oscillator 76 which drives counter 72 is adjusted to provide an output signal of a logical 1 corresponding to a count of $2^9$ in about 8 seconds. This will cause the logical 1 output signal corresponding to a count of $2^{10}$ to appear at terminal 73 in about 16 seconds, as illustrated in FIG. 4.

The frequency of oscillator 78 feeding counter 74 is adjusted to provide an output signal of a logical 1 corresponding to the count of $2^6$ in about 4 seconds if the entire first ring is to be muted. This will cause an output signal corresponding to $2^7$ to be reached in about 8 seconds also as illustrated in FIG. 4. If, however, just a portion of the first ring is to be muted by the muting circuit 28 with the remaining portion to be muted through disconnection of the call by the central station, then a count other than the count of $2^6$ may be used to trigger the flip-flop 90.

Operation of the circuit is as follows. When the first ringing signal is received, the output signal from ring detector circuit 30 causes the NOR circuit 68 to have a logical 1 output signal on terminal R which is applied to both counter 72 and counter 74. This allows both counters 72 and 74 to run. The output terminals 75 and 79 for counters 72 and 74, respectively, remain at logical 0 until predetermined counts are reached.

Figure 4:
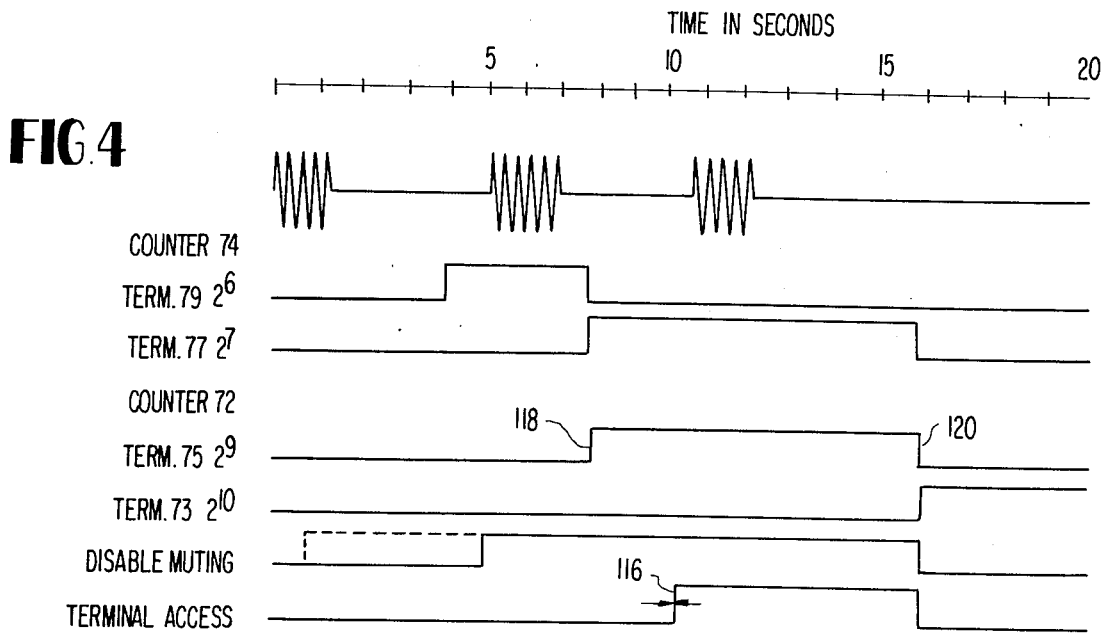
FIG. 4 is a timing diagram including waveforms of electrical signals at various locations throughout the circuit diagram of FIG. 3.

As shown in FIG. 4, after about 4 seconds or some other desired time period (e.g., ½ second if partial muting is desired), the output on terminal 79 of counter 74 changes to a logical 1. The output of NOR gate 86, however, remains at logical 0 even though flip-flop 90 has transferred. Counter 74 continues counting and no changes take place for an additional 4 seconds or until the end of 8 seconds from the beginning of the first ring signal.

If the second ring signal occurs before 8 seconds after the beginning of the first ringing signal, this indicates it is a normal telephone call and the counters 72 and 74 are both again reset to 0. This causes the signal on terminal 79 to return to a logical 0, which in turn causes no change in flip-flop 90 but does cause a logical 1 to be produced on lead 88 from NOR circuit 86, thereby causing the disable muting flip-flop 80 to trigger and produce a logical 1 on the output lead connected to light emitting diode 82. Disable muting flip-flop 80 remains in this condition with light emitting diode 82 energized until counter 74 is allowed to count to its full capacity of $2^7$. Since the counter 74 is reset upon each ringing signal, no change will occur in flip-flop 80 until either the telephone is answered or the call terminated by the originator.

As soon as the subscriber answers his telephone, the ringing signal stops and counter 74 soon counts up to its full count, thereby resetting both flip-flop 90 and disable muting flip-flop 80. In this condition, transistor 84 turns off thereby placing the capacitor 44 in series with transistor 46 across the telephone lines 24 and 26. The circuit voltage when the telephone is answered is between about 3 amd 5 volts. Zener diode 48 is set to 4.7 volts and therefore does not permit current flow through transistor 46, thereby keeping the capacitor 44 from swamping signals present on the telephone lines 24 and 26. After the telephone call is complete and the instrument returned to its quiescent position, no change in the circuit takes place.

If the second ringing signal occurs after about 16 seconds, the circuitry of FIG. 3 will have cycled through its operation and such a ring signal will be treated as the initiating or first ring signal.

If, however, the second ring signal is delayed more than about 8 seconds but less than 16 seconds, counter 72 will have reached the count of $2^9$ and a logical 1 will be on terminal 75 and applied to NOR circuit 104. The signal on lead 110 will thus go to a logical 0. The second ring signal will reset both counters 72 and 74. The second ring signal will also place a logical 0 on the other input lead 112 to NOR circuit 70 thereby providing a logical 1 signal to the input terminal 105 of terminal access flip-flop 102. This, in turn, causes diode 42 to become energized and causes transistor 40 to become conducting. This causes a latch-up at the phone network and stops further ringing signals.

Counter 74 will thus cycle through to time $2^7$ and stop. Counter 72 will start again and count to $2^{10}$, taking approximately 16 seconds (the time allowed for access to the data accumulator) and stop, thereby placing a set signal on input lead 106 of terminal access flip-flop 102 which will cause transistor 40 to become nonconducting and the phone network to disconnect, as in a completed call.

In the input signal to NOR circuit 104, it has been found that it is necessary to provide a resistor 113 and a capacitor 114 to provide a small delay before the input signal to NOR gate 104 is reset to a logical 0. This is desirable because the second ring signal which produces the reset signal on lead R at the output of NOR circuit 68 is also used on lead 112 to produce the logical 0 signal as the other input to NOR circuit 70. It is essential that both the inputs to NOR circuit 70 are simultaneously zero in order to produce a logical 1 output signal on input lead 105 to terminal access flip-flop 102 to change its conductive condition.

With reference to FIG. 4, the terminal access flip-flop output signal occurs at the position illustrated by line 116. This position can happen any time during the time interval between line 118 and line 120 which correspond to a logical 1 at terminal 75 corresponding to a count of $2^9$ in counter 72.

The timing of the second ringing signal can be easily achieved by use of two telephone instruments under the control of the same operator. Both instruments can be dialed simultaneously, with the last digit being withheld on one instrument until after the first ringing signal has occurred on the called line and the first instrument hung up to disconnect the line. The last digit can then be dialed on the second instrument so that the call is established within the window between lines 118 and 120 corresponding to a time period of 8 and 16 seconds beginning with the ring from the first telephone call.

In the event it is desired to operate the telephone call answer apparatus in the time window before the second ring signal occurs in normal operation, counter 72 can be operated so that line 118 occurs at the end of approximately 2 seconds and line 120 occurs before the end of 5 seconds to thereby reduce the time required for establishing the call and effecting the transaction. With automatic telephone dialers 12, the time of arrival of the second ringing signal may be controlled with precision. Thus, the automatic answer can either be before or after the normal second ringing signal. In addition, it is clear that the present circuit provides versatility and simplicity of adjustment to allow also for other timing sequences and will easily allow operation after any number of ring signals.

Figure 5:
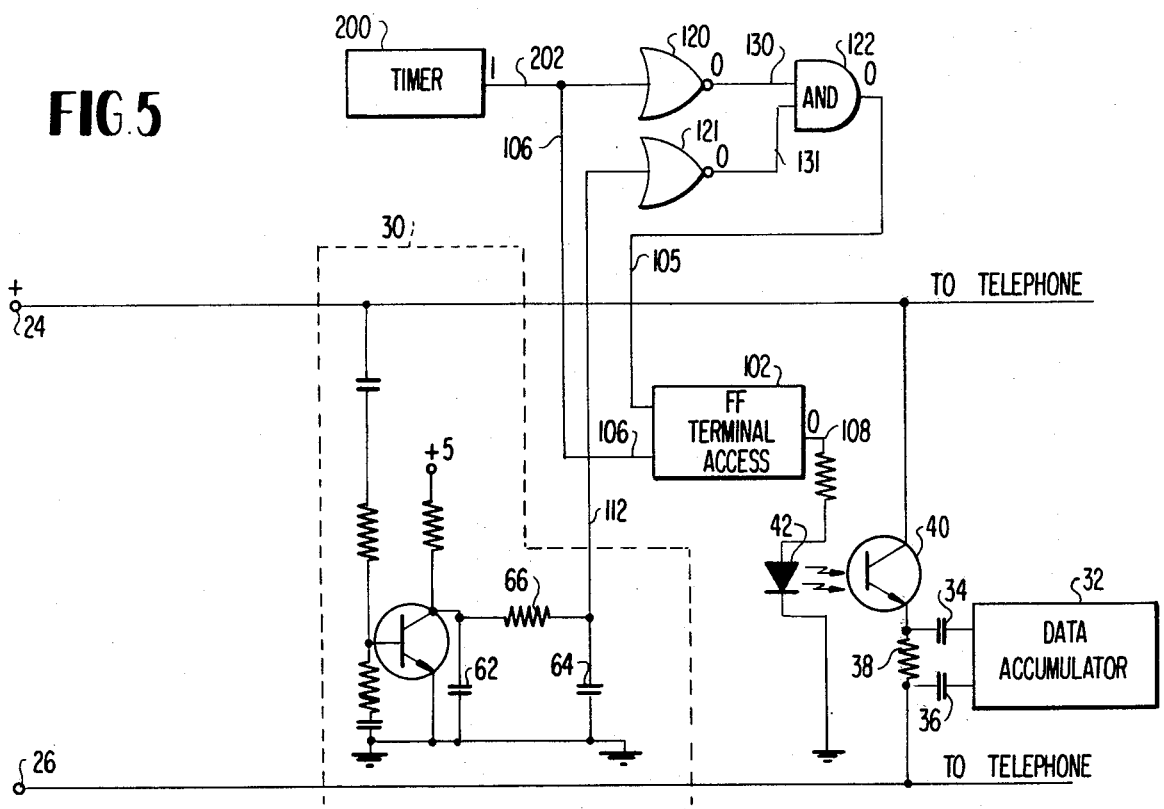
FIG. 5 is a partial diagram of a modification of the apparatus illustrated in the logic diagram of FIG. 3.

The embodiment shown in FIG. 5 provides for the central station to call to read the data accumulator during a period when it is unlikely that a normal call will be made to the telephone at the subscriber station. The subscriber station is preconditioned by a timer to respond to a call received during a known predetermined period to cause a call received during that period to connect the data accumulator to the line. Thus, the ring mute circuit 28 of FIG. 3 is omitted as are the counter circuits 74 and 72, respectively, for that equipment and for the control of the terminal access flip-flop 102.

More specifically, the ring detector circuit 30 is connected across the terminals 24 and 27 of the telephone line and the output of the filter 62, 64 and 66 provides a logical 1 signal on the line 112 when no ringing signal is being received, changing to a logical 0 when a ringing signal is being received. Also, the terminal access flip-flop 102 is retained and its output line 108 connected to energize light emitting diode 42 upon the flip-flop 102 output switching from logical 0 to logical 1.

Diode 42 is retained with its function of rendering transistor 40 conductive to connect resistor 38 across telephone lines 24, 26 thereby connect the data accumulator 32 to feed the billing processor.

A timer 200, normally producing a logical 1 output is connected through line 202 to NOR gate 120 normally having a logical 0 output on line 130. Line 130 is connected to one input of AND gate 122. The other input to AND gate 122 is derived from line 112 through NOR gate 121. Line 112 being at logical 1 with no ring signal, the output of NOR gate 121 is normally 0, resulting in the output of the AND gate 122 on line 105 normally being logical 0.

In operation, the timer 200 may be clock activated at a time when the telephone is not likely to be in normal use, as at 3:00 A. M., for a period of, for example, five minutes. Thus, the output of timer 200 changes from logical 1 to logical 0 for a time window period of five minutes. During this window, line 106 goes to logical 0 and NOR gate 120 changes output on line 130 to logical 1. If a ring occurs, logical 1 on line 112 goes to logical 0, and NOR gate 121 output line 131 goes to logical 1. With lines 130 and 131 simultaneously at logical 1 AND gate 122 output goes to logical 1 which is applied to line 105. Logical 0 on line 106 removes set input on terminal access flip-flop 102. Logical 1 on line 105 causes reset of flip-flop 102 so that it provides logical 1 on output line 108 and causes actuation of diode 42 to render transistor 40 conducting. This causes coupling of data accumulator 32 to the lines 24, 26 while the data is read therefrom by the billing processor 10 at the central station (FIG. 1).

At the end of the data window provided by the preconditioning timer 200, timer output line 106 goes to logical 1, causing flip-flop 102 to set and light emitting diode 42 to extinguish. As a result transistor 40 becomes nonconducting and releases telephone line for normal operation. The timer 200 may be of a construction known in the art, being electronic, electromechanical, etc.

Figure 6:
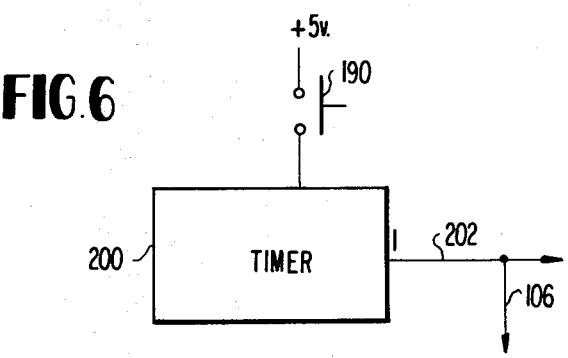
FIG. 6 is a partial diagram of a modification applicable to the form of the invention illustrated in FIG. 5.

FIG. 6 illustrates a modification applicable to the form of the invention illustrated in FIG. 5. With this modification the preconditioning timer 200 is normally in the state placing logical 1 on its output line 106. A preconditioning switch 190 is operable to connect a 5 volt source to the timer to render it operative to provide a logical 0 output for a preselected period of time. In use, the subscriber may telephone the central station to inform it that he is about to operate the timer so that the central station may call the subscriber within the time frame provided to cause connection of the data accumulator to the telephone lines for reading. Alternatively, the subscriber may be advised to close the switch by an announcement to a pay television program. Further, the switch 190 may be closed automatically by a signal transmitted thereto when the central station desired to read the data accumulator. In the case where the data accumulator 32 operates in conjunction with pay or cable television, the preconditioning signal may be an AM pulse of a predetermined amplitude or duration impressed on operating means for the switch.

It can also be seen that telephone answering device may be a conventional electromechanical answering device which is preconditioned to answer a call from the central station in one of the manners described previously. The telephone could thus be automatically answered by being lifted off the hook-switch when it is determined that the calls is from the central station. The data could then be acoustically fed into the telephone headset in response to a "read" signal from the computer at the central station.

From the foregoing description, it will be made clear that the present invention may be embodied in other specific forms without departing from the spirit or essential characteristics thereof. The presently disclosed embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

What is claimed and intended to be covered by letters patent is:

1. A method of accumulating data at a central location from a plurality of remote locations each including a telephone with an audible signalling means connected to nondedicated telephone lines without interference with normal telephone service comprising the steps of:

providing at each remote location a selectively operable telephone answering device, including an associated data accumulator, connected across the nondedicated telephone lines in parallel therewith;

accumulating data in each data accumulator;

selectively conditioning the answering device at one of the plurality locations to intercept a call over the telephone lines within a predetermined time window without actuating the audible signalling means on the telephone;

initiating a call from the central location to the telephone at one of the plurality of locations subsequent to conditioning the access device, and during the time window;

answering the subsequently initiated call with the answering device to thereby connect the remote and central locations over the nondedicated telephone lines without actuating the audible signaling means on the telephone; and transferring data from the data accumulator at the remote location to a utilization device at the central location over the nondedicated telephone lines connecting the remote and central locations.

2. The method of claim 1 wherein the answering device at the remote location is selectively conditioned by:

dialing a telephone number associated with the telephone at the desired remote location to initiate a telephone call to the remote location over the nondedicated telephone lines;

muting the audible signalling meand during at least a portion of the first ringing signal received at the remote location over the nondedicated telephone lines; and disconnecting the call initiated to the remote location prior to the time of the second ringing signal.

3. The method of claim 1 wherein the answering device at the remote location is selectively conditioned by transmitting a signal to the remote location to set a timer at the remote location and enable the answering device to answer calls during said predetermined time window.

4. The method of claim 1 wherein the data accumulator is connected to receive viewing data from a pay TV subscriber for billing purposes.

5. A method of accumulating data at a central location from a plurality of remote locations each including a telephone with an audible signalling means connected to nondedicated telephone lines without interference with normal telephone service comprising the steps of:
provided at each remote location a selectively operable telephone answering device, including an associated data accumulator and a ring detecting means, connected to the nondedicated telephone lines in parallel therewith;
placing a first telephone call from the central location to the telephone at one of the remote locations to thereby initiate the transmission of sequential, periodic ringing signals to one remote location over the nondedicated telephone lines;
muting the audible signalling means during at least a portion of the first ringing signal received at the remote location;
in response to the muted portion of the first ringing signal, conditioning the answering device to intercept a subsequent ringing signal outside the periodic sequence of ringing signals of the first telephone call and to connect the data accumulator to the nondedicated telephone lines;
disconnecting the first telephone call prior to the transmission of the second ringing signal in the periodic sequence associated with the first call;
placing a second telephone call from the central location to the telephone at the one remote location to initiate the transmission of a second series of sequential, periodic ringing signals to the one remote location at a time such that the first ringing signal of the second telephone call is received at the one remote location outside the periodic sequence of the ringing signals of the first telephone call; and
connecting the data accumulator to the nondedicated telephone lines in response to detection by the answering device of the first ringing signal of the second telephone call without actuating the audible signalling means.

6. An accumulator access system comprising:
a plurality of selectively operable telephone answering devices at remote locations, each device including a telephone with an audible signalling means and an associated data accumulator and being connected across nondedicated telephone lines in parallel therewith so as not to interfere with normal telephone service;
means for selectively conditioning one of said answering devices to intercept a call over the telephone lines within a predetermined time window without actuating the audible signalling means on the telephone;
means for initiating a call from a central location including a data utilization device to one of the telephones subsequent to conditioning the access device, and during the time window;
means for answering the initiated call with the answering device to connect the remote location over the telephone lines without actuating the audible signalling means on the telephone; and
means for transferring data from the data accumulator at said one of said remote locations to the utilization device at the central location over the telephone lines connecting said remote location and said central location.

7. The system of claim 6 wherein the system further comprises:
means for dialing a telephone number associated with the telephone at the desired remote location to initiate a telephone call to the remote location over the nondedicated telephone lines;
means for muting the audible signalling means during at least a portion of the first ringing signal received at the remote location over the nondedicated telephone lines; and
means at the central location for disconnecting the call initiated to the remote location prior to the time of the second ringing signal.

8. The system of claim 6 wherein the answering device at the remote location includes a timer, and is adapted to be conditioned by a signal transmitted to the remote location to set the timer to enable the answering device to answer calls during said predetermined time window.

9. The system of claim 6 wherein means are included to provide the data accumulator with viewing data from a pay TV subscriber for billing purposes.

10. A system for accumulating data at a central location from a plurality of remote locations each including a telephone with an audible signalling means connected to nondedicated telephone lines without interference with normal telephone service comprising:
a selectively operable telephone answering device at each of said remote locations, each device inluding a data accumulator and a ring detecting means and being connected to nondedicated telephone lines in parallel therewith;
means responsive to placing a first telephone call from the central location to the telephone at one of said remote locations to initiate the transmission of sequential, periodic ringing signals to the one remote location over the telephone lines;
means for muting said audible signalling means during at least a portion of the first ringing signal received at the remote location;
means responsive to the muted portion of the first ringing signal for conditioning the answering device to intercept a subsequent ringing signal outside the periodic sequence of ringing signals of the first telephone call and connect the data accumulator to the telephone lines;
means at the central location for disconnecting the first telephone call prior to the transmission of the second ringing signal in the periodic sequence associated with the first call;
means for placing a second telephone call from the central location to the telephone at the one remote location and initiating the transmission of a second series of sequential, periodic signals to the one remote location at a time such that the first ringing signal of the second telephone call is received at the one remote location outside the periodic sequence of the ringing signals of the first telephone call; and
means connecting the data accumulator to the telephone lines in response to detection by the answering device of the first ringing signal of the second telephone call without actuating the audible signalling means.

11. An accumulator access system comprising:
a plurality of subscriber stations each having a telephone instrucment and a data accumulator;
a centerl station billing processor for collecting data from each of said subscriber stations including:
  (1) means for initiating a call through a telephone system to establish a connection between the central station billing processor and a subscriber station through a telephone switching station which generates a calling signal comprising a series of spaced pulses each composed of a plurality of alternating voltage signals;
each subscriber station further including:
  (1) a telephone instrument having an audio-frequency generating means normally operative in response to each of said series of pulses and
  (2) a telephone call answering apparatus connected in parallel with the telephone comprising means for muting said audio-frequency generating means during at least part of the first pulse of a calling signal, means operable in response to the receipt of said first pulse for producing a gating signal having a duration which excludes the time within which the second pulse of a normal calling signal occurs, a gate having two inputs, means for applying the gating signal to one input of said gate, means for generating an operating signal pulse in response to a second calling signal pulse received during the duration of said gating signal, means for applying said operating (second calling) signal pulse to another input of said gate, and means connected to said gate for connecting said data accumulator to said telephone line without actuating said audio-frequency generating means.

* * * * *